US009363370B2

(12) United States Patent
LaBauve et al.

(10) Patent No.: US 9,363,370 B2
(45) Date of Patent: *Jun. 7, 2016

(54) METHODS OF DELIVERING CALLS ON DUAL-MODE WIRELESS HANDSETS

(75) Inventors: Lance LaBauve, Highlands Ranch, CO (US); Charles I. Cook, Louisville, CO (US); Gilman R. Stevens, Fairview, TX (US)

(73) Assignee: Qwest Communications International Inc., Denver, CO (US)

( * ) Notice: Subject to any disclaimer, the term of this patent is extended or adjusted under 35 U.S.C. 154(b) by 1519 days.

This patent is subject to a terminal disclaimer.

(21) Appl. No.: 11/101,182

(22) Filed: Apr. 6, 2005

(65) Prior Publication Data

US 2006/0229098 A1   Oct. 12, 2006

(51) Int. Cl.
*H04W 88/06* (2009.01)
*H04M 3/42* (2006.01)
*H04M 7/00* (2006.01)
*H04Q 3/00* (2006.01)
*H04W 36/14* (2009.01)

(52) U.S. Cl.
CPC .......... *H04M 3/42246* (2013.01); *H04M 7/006* (2013.01); *H04Q 3/0029* (2013.01); *H04W 36/14* (2013.01); *H04Q 2213/13034* (2013.01); *H04Q 2213/13098* (2013.01); *H04Q 2213/13282* (2013.01); *H04Q 2213/13389* (2013.01)

(58) Field of Classification Search
CPC ....... H04W 88/06; H04W 36/30; H04W 4/16; H04L 29/08108
USPC ................ 455/414.1, 426.1, 436, 445, 552.1, 455/90.2, 127.4
See application file for complete search history.

(56) References Cited

U.S. PATENT DOCUMENTS

| | | | | |
|---|---|---|---|---|
| 6,167,261 | A * | 12/2000 | Amin | 455/426.1 |
| 6,317,609 | B1 * | 11/2001 | Alperovich et al. | 455/556.1 |
| 6,363,253 | B1 * | 3/2002 | Valentine et al. | 455/445 |
| 6,577,637 | B1 * | 6/2003 | Sieppi | 370/401 |

(Continued)

OTHER PUBLICATIONS

U.S. Appl. No. 11/490,492, Office Action dated Jun. 3, 2009, 22 pages.

(Continued)

*Primary Examiner* — Hai V Nguyen
(74) *Attorney, Agent, or Firm* — Swanson & Bratschun, L.L.C.

(57) ABSTRACT

Embodiments of the invention provide novel solutions, including systems, methods and/or software, for providing handoffs between cellular providers and VoIP providers. In some cases, for example, upon the initiation of a call from a dual-mode cellular phone, the cellular network (and/or a component thereof) may be configured to store the dialed number and/or substitute a predetermined number for the dialed number. The predetermined number may be associated with a VoIP provider's system. Hence, in a particular embodiment, the call may be routed (e.g., via the PSTN) to the VoIP provider's system, which may be configured to obtain (perhaps from an application server) the original dialed number and/or to route the call (e.g., via the PSTN) to the original dialed number. If the dual-mode phone subsequently obtains IP access, a VoIP connection may be established between the VoIP system and the phone and/or a handoff may be performed (e.g., in the VoIP system) to transfer the call from the cellular connection to the VoIP connection. Optionally, the cellular connection may be terminated.

20 Claims, 9 Drawing Sheets

(56) References Cited

U.S. PATENT DOCUMENTS

| | | | |
|---|---|---|---|
| 6,622,016 B1* | 9/2003 | Sladek et al. | 455/414.1 |
| 6,636,504 B1* | 10/2003 | Albers et al. | 370/352 |
| 6,768,738 B1* | 7/2004 | Yazaki et al. | 370/392 |
| 6,795,444 B1* | 9/2004 | Vo et al. | 370/401 |
| 6,865,266 B1* | 3/2005 | Pershan | 379/221.13 |
| 6,888,808 B2* | 5/2005 | Jagadeesan et al. | 370/328 |
| 6,940,848 B1* | 9/2005 | Liu et al. | 370/352 |
| 6,947,531 B1* | 9/2005 | Lewis et al. | 379/114.13 |
| 6,954,441 B2* | 10/2005 | Musikka | 370/328 |
| 6,965,666 B1* | 11/2005 | Zhang | 379/88.17 |
| 6,993,359 B1* | 1/2006 | Nelakanti et al. | 455/554.1 |
| 7,039,027 B2* | 5/2006 | Bridgelall | 370/329 |
| 7,046,647 B2* | 5/2006 | Oba et al. | 370/331 |
| 7,050,813 B1* | 5/2006 | Paiz | 455/446 |
| 7,054,636 B1* | 5/2006 | Howe | 455/445 |
| 7,065,363 B1* | 6/2006 | Pruuden et al. | 455/445 |
| 7,068,622 B2* | 6/2006 | Jagadeesan et al. | 370/328 |
| 7,082,301 B2 | 7/2006 | Jagadeesan et al. | |
| 7,103,168 B2* | 9/2006 | Bedingfield et al. | 379/216.01 |
| 7,120,135 B2* | 10/2006 | Kim | 370/329 |
| 7,136,651 B2* | 11/2006 | Kalavade | 455/445 |
| 7,142,657 B2 | 11/2006 | Woodson et al. | |
| 7,154,868 B1* | 12/2006 | Sharma et al. | 370/331 |
| 7,162,236 B2* | 1/2007 | Dorenbosch | H04W 76/02 370/338 |
| 7,171,209 B2* | 1/2007 | Numminen et al. | 455/445 |
| 7,184,418 B1* | 2/2007 | Baba et al. | 370/331 |
| 7,200,400 B2* | 4/2007 | Creamer et al. | 455/437 |
| 7,203,185 B1* | 4/2007 | Dhara et al. | 370/352 |
| 7,206,582 B2* | 4/2007 | Tom et al. | 455/445 |
| 7,227,853 B2* | 6/2007 | Jagadeesan et al. | 370/338 |
| 7,242,757 B2* | 7/2007 | Hahm et al. | 379/207.16 |
| 7,263,354 B2* | 8/2007 | Naim et al. | 455/422.1 |
| 7,269,164 B2* | 9/2007 | Heubel et al. | 370/352 |
| 7,280,505 B2* | 10/2007 | Chaskar | H04W 36/0011 370/331 |
| 7,283,823 B2* | 10/2007 | Pearce et al. | 455/439 |
| 7,298,833 B2* | 11/2007 | Klein et al. | 379/201.02 |
| 7,302,258 B1 | 11/2007 | Sylvain | |
| 7,319,864 B2* | 1/2008 | Jagadeesan et al. | 455/417 |
| 7,342,919 B2* | 3/2008 | Zhang et al. | 370/352 |
| 7,353,022 B2* | 4/2008 | Howe | 455/432.3 |
| 7,356,001 B1* | 4/2008 | Jones | H04W 84/02 370/331 |
| 7,383,046 B2* | 6/2008 | Jagadeesan et al. | 455/436 |
| 7,408,935 B2* | 8/2008 | Yazaki et al. | 370/392 |
| 7,450,563 B2* | 11/2008 | Cook et al. | 370/352 |
| 7,475,140 B2* | 1/2009 | Requena | 709/225 |
| 7,502,615 B2* | 3/2009 | Wilhoite et al. | 455/442 |
| 7,519,049 B2* | 4/2009 | Masuda | 370/352 |
| 7,542,558 B2* | 6/2009 | Klein et al. | 379/201.01 |
| 7,565,167 B2* | 7/2009 | Lee et al. | 455/560 |
| 7,606,568 B2* | 10/2009 | Gallagher | H04W 60/04 370/331 |
| 7,610,047 B2* | 10/2009 | Hicks et al. | 455/433 |
| 7,626,932 B2* | 12/2009 | Tuulos et al. | 370/235 |
| 7,634,269 B2* | 12/2009 | Gallagher | 455/436 |
| 7,634,270 B2* | 12/2009 | Gallagher | H04W 60/04 370/328 |
| 7,634,271 B2* | 12/2009 | Gallagher | H04W 60/04 370/331 |
| 7,640,008 B2* | 12/2009 | Gallagher | H04W 16/16 455/414.1 |
| 7,664,501 B2* | 2/2010 | Dutta et al. | 455/436 |
| 7,668,558 B2* | 2/2010 | Gallagher | H04W 60/04 370/331 |
| 7,684,803 B2* | 3/2010 | Gallagher | H04W 60/04 370/331 |
| 7,693,135 B2* | 4/2010 | Pershan | 370/352 |
| 7,720,481 B2* | 5/2010 | Gallagher et al. | 455/439 |
| 7,742,768 B2* | 6/2010 | Liu et al. | 455/445 |
| 7,769,385 B2* | 8/2010 | Gallagher | H04W 60/04 370/331 |
| 7,773,993 B2* | 8/2010 | Gallagher | H04W 60/04 370/331 |
| 7,809,381 B2* | 10/2010 | Aborn et al. | 455/456.5 |
| 7,818,007 B2* | 10/2010 | Gallagher | H04W 60/04 370/329 |
| 7,826,868 B2* | 11/2010 | Robbins et al. | 455/560 |
| 7,890,099 B2* | 2/2011 | Mohammed | 455/432.1 |
| 7,949,326 B2* | 5/2011 | Gallagher | H04W 16/16 455/404.1 |
| 7,996,006 B2* | 8/2011 | Howe | 455/432.3 |
| 8,005,070 B2* | 8/2011 | Marsh et al. | 370/352 |
| 8,036,192 B2* | 10/2011 | Yaqub et al. | 370/338 |
| 8,054,165 B2* | 11/2011 | Gallagher | H04W 60/04 340/286.02 |
| 8,090,371 B2* | 1/2012 | Gallagher | H04W 60/04 370/331 |
| 8,150,401 B2* | 4/2012 | Howe | 455/445 |
| 8,825,108 B2* | 9/2014 | LaBauve | H04L 29/06027 370/352 |
| 8,843,107 B2 | 9/2014 | Altberg et al. | |
| 8,989,813 B2* | 3/2015 | LaBauve | H04L 29/06027 455/553.1 |
| 2001/0046215 A1* | 11/2001 | Kim | 370/329 |
| 2002/0058494 A1* | 5/2002 | Timonen et al. | 455/405 |
| 2002/0075850 A1* | 6/2002 | Cruz et al. | 370/352 |
| 2002/0085516 A1* | 7/2002 | Bridgelall | 370/329 |
| 2002/0133457 A1* | 9/2002 | Gerlach | G06Q 20/10 705/39 |
| 2002/0141381 A1* | 10/2002 | Gawargy et al. | 370/352 |
| 2002/0147008 A1* | 10/2002 | Kallio | 455/426 |
| 2004/0072593 A1* | 4/2004 | Robbins et al. | 455/560 |
| 2004/0090954 A1* | 5/2004 | Zhang et al. | 370/352 |
| 2004/0127194 A1* | 7/2004 | Lippelt | 455/406 |
| 2004/0180654 A1 | 9/2004 | Chen | |
| 2004/0196810 A1* | 10/2004 | Kil et al. | 370/331 |
| 2004/0203791 A1 | 10/2004 | Pan et al. | |
| 2004/0213212 A1* | 10/2004 | Reding et al. | 370/352 |
| 2004/0240441 A1* | 12/2004 | Sriram | 370/389 |
| 2004/0246990 A1* | 12/2004 | Krishnamurthi et al. | 370/466 |
| 2004/0248593 A1* | 12/2004 | Hicks et al. | 455/462 |
| 2004/0248595 A1* | 12/2004 | Hicks et al. | 455/465 |
| 2004/0259541 A1* | 12/2004 | Hicks et al. | 455/426.1 |
| 2004/0264410 A1 | 12/2004 | Sagi et al. | |
| 2004/0266426 A1* | 12/2004 | Marsh et al. | 455/426.2 |
| 2004/0266437 A1* | 12/2004 | Vempati et al. | 455/436 |
| 2005/0038876 A1* | 2/2005 | Chaudhuri | 709/219 |
| 2005/0063359 A1* | 3/2005 | Jagadeesan et al. | 370/352 |
| 2005/0101329 A1* | 5/2005 | Gallagher | 455/436 |
| 2005/0136890 A1* | 6/2005 | Lippelt | 455/406 |
| 2005/0148353 A1* | 7/2005 | Hicks et al. | 455/466 |
| 2005/0148362 A1* | 7/2005 | Jagadeesan et al. | 455/555 |
| 2005/0152343 A1* | 7/2005 | Rajagopalan | 370/352 |
| 2005/0190721 A1* | 9/2005 | Pershan | 370/328 |
| 2005/0190747 A1* | 9/2005 | Sindhwani et al. | 370/352 |
| 2005/0195802 A1* | 9/2005 | Klein et al. | 370/352 |
| 2005/0195954 A1* | 9/2005 | Klein et al. | 379/201.04 |
| 2005/0201362 A1* | 9/2005 | Klein et al. | 370/352 |
| 2005/0239498 A1* | 10/2005 | Dorenbosch | H04W 76/02 455/552.1 |
| 2005/0286466 A1* | 12/2005 | Tagg et al. | 370/329 |
| 2006/0019664 A1* | 1/2006 | Nelakanti et al. | 455/436 |
| 2006/0019667 A1* | 1/2006 | Hicks | 455/445 |
| 2006/0025141 A1* | 2/2006 | Marsh et al. | 455/445 |
| 2006/0045069 A1* | 3/2006 | Zehavi et al. | 370/352 |
| 2006/0046714 A1* | 3/2006 | Kalavade | 455/428 |
| 2006/0058032 A1* | 3/2006 | Pearce et al. | 455/444 |
| 2006/0072726 A1* | 4/2006 | Klein et al. | 379/201.01 |
| 2006/0083199 A1* | 4/2006 | Yang | 370/331 |
| 2006/0089169 A1 | 4/2006 | Tsao et al. | |
| 2006/0092925 A1* | 5/2006 | Svensson et al. | 370/352 |
| 2006/0098801 A1* | 5/2006 | Hahm et al. | 379/257 |
| 2006/0105754 A1* | 5/2006 | Jagadeesan et al. | 455/417 |
| 2006/0105766 A1* | 5/2006 | Azada et al. | 455/432.1 |
| 2006/0105770 A1* | 5/2006 | Jagadeesan et al. | 455/444 |
| 2006/0109819 A1* | 5/2006 | Marin et al. | 370/331 |
| 2006/0111114 A1* | 5/2006 | Marin et al. | 455/442 |
| 2006/0111115 A1* | 5/2006 | Marin et al. | 455/442 |
| 2006/0116127 A1* | 6/2006 | Wilhoite et al. | 455/442 |
| 2006/0120351 A1* | 6/2006 | Rajagopalan | 370/352 |
| 2006/0121891 A1* | 6/2006 | Jagadeesan et al. | 455/417 |
| 2006/0121902 A1* | 6/2006 | Jagadeesan et al. | 455/439 |

(56) References Cited

U.S. PATENT DOCUMENTS

| | | | |
|---|---|---|---|
| 2006/0121916 A1* | 6/2006 | Aborn et al. | 455/456.5 |
| 2006/0142010 A1* | 6/2006 | Tom et al. | 455/445 |
| 2006/0146793 A1* | 7/2006 | Benco et al. | 370/352 |
| 2006/0147022 A1* | 7/2006 | Karnalkar et al. | 379/221.08 |
| 2006/0176874 A1* | 8/2006 | Shaffer et al. | 370/352 |
| 2006/0176876 A1* | 8/2006 | Aborn et al. | 370/352 |
| 2006/0178147 A1* | 8/2006 | Jagadeesan et al. | 455/436 |
| 2006/0183478 A1* | 8/2006 | Jagadeesan et al. | 455/436 |
| 2006/0205392 A1* | 9/2006 | Jagadeesan et al. | 455/414.1 |
| 2006/0205436 A1* | 9/2006 | Liu et al. | 455/560 |
| 2006/0209794 A1* | 9/2006 | Bae | H04L 12/6418 370/352 |
| 2006/0229090 A1* | 10/2006 | LaDue | 455/507 |
| 2006/0229101 A1* | 10/2006 | LaBauve | H04M 3/42246 455/560 |
| 2006/0233339 A1* | 10/2006 | Schwartz | 379/207.02 |
| 2006/0251113 A1* | 11/2006 | Jagadeesan et al. | 370/465 |
| 2006/0268750 A1* | 11/2006 | Weiner | 370/260 |
| 2006/0276192 A1* | 12/2006 | Dutta et al. | 455/436 |
| 2006/0281443 A1 | 12/2006 | Chen et al. | |
| 2007/0015535 A1* | 1/2007 | LaBauve | H04L 29/06027 455/552.1 |
| 2007/0015536 A1* | 1/2007 | LaBauve et al. | 455/552.1 |
| 2007/0026862 A1* | 2/2007 | Hicks et al. | 455/436 |
| 2007/0036143 A1* | 2/2007 | Alt | H04L 12/6418 370/352 |
| 2007/0060124 A1* | 3/2007 | Kalavade | 455/433 |
| 2007/0091845 A1* | 4/2007 | Bridgelall | 370/331 |
| 2007/0116249 A1* | 5/2007 | Bedingfield et al. | 379/355.05 |
| 2007/0281687 A1* | 12/2007 | Jiang | 455/433 |
| 2007/0293216 A1* | 12/2007 | Jiang | 455/433 |
| 2008/0020756 A1* | 1/2008 | Jiang | 455/432.1 |
| 2008/0025295 A1* | 1/2008 | Elliott et al. | 370/356 |
| 2008/0058003 A1* | 3/2008 | Rydnell et al. | 455/552.1 |
| 2008/0076428 A1 | 3/2008 | Jagadeesan et al. | |
| 2008/0152123 A1 | 6/2008 | Pazhyannur et al. | |
| 2008/0299976 A1* | 12/2008 | Gallagher | H04W 60/04 455/436 |
| 2008/0311916 A1* | 12/2008 | Gallagher | H04W 60/04 455/436 |
| 2009/0016519 A1* | 1/2009 | Bedingfield et al. | 379/216.01 |
| 2009/0082012 A1* | 3/2009 | Gallagher | H04W 60/04 455/426.1 |
| 2009/0082022 A1* | 3/2009 | Gallagher | H04W 60/04 455/436 |
| 2009/0170519 A1* | 7/2009 | Wilhoite et al. | 455/436 |
| 2009/0190468 A1* | 7/2009 | Gillot et al. | 370/216 |
| 2009/0285371 A1* | 11/2009 | Easley et al. | 379/88.22 |
| 2010/0150110 A1* | 6/2010 | Dutta et al. | 370/331 |
| 2012/0069754 A1 | 3/2012 | Marsh et al. | |
| 2014/0335854 A1 | 11/2014 | LaBauve et al. | |
| 2015/0156684 A1 | 6/2015 | LaBauve et al. | |
| 2015/0257045 A1 | 9/2015 | LaBauve et al. | |

OTHER PUBLICATIONS

United States Patent and Trademark Office International Search Report and Written Opinion, Dec. 1, 2008, pp. 1-7.

U.S. Appl. No. 11/101,160, Office Action dated Mar. 27, 2009, 15 pages.

U.S. Appl. No. 11/101,160, Office Action dated Nov. 23, 2009, 14 pages.

U.S. Appl. No. 11/101,160, Final Office Action dated Jan. 6, 2009, 16 pages.

U.S. Appl. No. 11/101,160, Final Office Action dated Jun. 18, 2010, 13 pages.

U.S. Appl. No. 11/101,160, Office Action dated Mar. 18, 2008, 23 pages.

U.S. Appl. No. 11/101,182, Final Office Action dated Jan. 7, 2009, 14 pages.

U.S. Appl. No. 11/101,182, Final Office Action dated Jun. 17, 2010, 14 pages.

U.S. Appl. No. 11/101,182, Office Action dated Mar. 30, 2009, 11 pages.

U.S. Appl. No. 11/101,182, Office Action dated Nov. 13, 2009, 9 pages.

U.S. Appl. No. 11/101,182, Office Action dated Mar. 21, 2008, 18 pages.

U.S. Appl. No. 11/490,492, Advisory Action dated Mar. 25, 2010, 3 pages.

U.S. Appl. No. 11/490,492, Final Office Action dated Dec. 28, 2009, 37 pages.

U.S. Appl. No. 11/490,515, Office Action dated Apr. 24, 2009, 13 pages.

U.S. Appl. No. 11/490,515, Office Action dated Jan. 5, 2009, 5 pages.

U.S. Appl. No. 11/490,515, Office Action dated Nov. 5, 2009, 12 pages.

U.S. Appl. No. 11/490,515, Final Office Action dated May 21, 2010, 12 pages.

U.S. Appl. No. 11/490,515, Office Action dated Nov. 17, 2010, 20 pages.

U.S. Appl. No. 11/490,515, Final Office Action dated Mar. 9, 2011, 21 pages.

U.S. Appl. No. 11/101,160, Office Action dated May 10, 2011, 28 pages.

U.S. Appl. No. 11/101,160, Final Office Action dated Sep. 15, 2011; 19 pages.

U.S. Appl. No. 11/490,515; Examiner's Answer dated Oct. 24, 2011; 32 pages.

U.S. Appl. No. 11/490,492; Non Final Office Action dated Feb. 27, 2012; 40 pages.

U.S. Appl. No. 11/101,160; Non Anal Office Action dated Dec. 21, 2011; 23 pages.

U.S. Appl. No. 11/101,160; Interview Summary dated Jan. 26, 2012; 3 pages.

U.S. Appl. No. 11/490,515; Office Communication dated Feb. 22, 2012; 3 pages.

U.S. Appl. No. 11/10/,160; Final Rejection dated Apr. 11, 2012; 29 pages.

U.S. Appl. No. 11/101,160; Notice of Allowance dated Feb. 4, 2016; 26 pages.

U.S. Appl. No. 11/101,160, Appeal Decision dated Sep. 25, 2015; 7 pages.

U.S. Appl. No. 11/101,160; Examiner's Answer dated Jan. 3, 2013; 9 pages.

U.S. Appl. No. 11/101,160; Non Final Office Action dated Dec. 2, 2010; 17 pages.

U.S. Appl. No. 11/101,160; Notice of Allowance dated Dec. 4, 2015; 20 pages.

U.S. Appl. No. 11/490,492; Final Rejection dated Sep. 13, 2012; 42 pages.

U.S. Appl. No. 11/490,492; Final Rejection dated Jan. 16, 2014; 25 pages.

U.S. Appl. No. 11/490,492; Issue Notification dated Aug. 13, 2014; 1 page.

U.S. Appl. No. 11/490,492; Non-Final Rejection dated Jun. 20, 2013; 42 pages.

U.S. Appl. No. 11/490,492; Notice of Allowance dated May 1, 2014; 27 pages.

U.S. Appl. No. 11/490,515, Issue Notification dated Mar. 4, 2015, 1 page.

U.S. Appl. No. 11/490,515; Decision on Appeal dated Nov. 4, 2014; 6 pages.

U.S. Appl. No. 11/490,515; Notice of Allowance dated Nov. 12, 2014; 26 pages.

* cited by examiner

METHODS OF DELIVERING CALLS ON DUAL-MODE WIRELESS HANDSETS

CROSS-REFERENCE TO RELATED APPLICATIONS

This application is related to U.S. application Ser. No. 11/101,160, filed on a date even herewith by LaBauve et al. and entitled "Systems for Delivering Calls on Dual-Mode Wireless Handsets", the entire disclosure of which is incorporated herein by reference for all purposes.

BACKGROUND OF THE INVENTION

The present invention relates generally to telecommunications and more specifically to call delivery in wireless and/or dual-mode environments.

Recent advances in telecommunications technology, including without limitation the ever-increasing availability of high-bandwidth data connections (such as broadband Internet access, etc.), have made voice over Internet Protocol ("VoIP") a feasible alternative for many telephone users. Merely by way of example, a residential subscriber might choose, in lieu of contracting through a POTS provider for voice service, to subscribe only to a broadband connection (e.g., a cable modem, xDSL modem, etc.) and to contract with a VoIP provider for voice services.

In a typical VoIP system, a subscriber may use any available connection with the Internet (including without limitation, residential and/or commercial Internet connections, wireless "hotspots" in various public locations, Bluetooth connections with Internet-connected devices, etc.) to access, again via the Internet, a VoIP server maintained by a VoIP provider with which the subscriber has contracted. This arrangement provides multiple benefits to the subscriber. For one thing, the connection is portable, in that the user may make and/or receive calls (often using a single telephone number) from virtually any location with a sufficient Internet connection. Additionally, the use of the Internet to route calls often means that the user may obtain flat-rate (and/or low per-minute rate) long-distance and/or International voice service. Moreover, the use of the Internet to route calls allows the subscriber to maintain a "local" telephone number in any desired market where the provider has a point of presence, meaning for example that a subscriber located in Denver may maintain a local telephone number in Seattle, allowing callers in Seattle to reach the subscriber through a local call. Those skilled in the art will appreciate the many other features and enhanced services that may be provided by VoIP service.

In particular, the use of the Internet (and/or any other Internet Protocol ("IP") connection) to route VoIP calls can provide substantial gains in efficiency (and thus substantial savings) for both subscribers and providers. Realizing these benefits, subscribers have begun to rely more heavily on VoIP as an alternative (and, in some cases, primary) mode of voice communications. Correspondingly, there is substantial market demand for ever more pervasive and comprehensive VoIP offerings.

One example of this market demand is for dual mode cellularNoIP service. Those skilled in the art will appreciate that cellular service often carries relatively expensive per-minute charges (and/or monthly minute quotas with expensive overage charges). Cellular subscribers, then, desire the ability to use a single phone (ideally with a single number) in both a cellular network and for VoIP communications (e.g., through a wireless IP connection). Providers have embarked on plans to offer this service, and some phone manufacturers have begun to manufacture "dual mode" phones that can function as both cellular phones and VoIP phones.

To maximize the benefits of such services, subscribers generally desire a phone and/or network with the ability to transition seamlessly between cellular and VoIP modes, ideally during a call. For example, if a subscriber places a call while enjoying an IP connection (e.g., within range of a WiFi hotspot, etc.) and subsequently loses that connection, the subscriber would like the call to remain active over the cellular network. By the same token, if a caller begins a call in the cellular network and subsequently acquires an IP connection (again, perhaps, by traveling within range of a WiFi hotspot), the caller often would prefer to use VoIP instead of the cellular service, since a VoIP call typically will be less expensive than a cellular call. A typical subscriber, however, would not tolerate the inconvenience of ending the call and re-dialing the other party merely to use the VoIP service instead of the cellular service.

This, however, may present a logistical problem. For instance, if a subscriber originates a call in a cellular network, it may be possible to route the call from a cellular provider to a VoIP provider using a trunk connection, for example, and from the VoIP provider to the desired destination number. When the user obtains an IP connection, the cellular provider may handoff the call to the VoIP provider. One skilled in the art will appreciate, however, that in conventional systems, the trunk connection will remain active for the duration of the call. Even if the subscriber no longer has to pay charges associated with the cellular network, the VoIP provider may be forced to pay charges related to the use of the cellular providers' trunk ports, among other things. Thus, the VoIP provider often will be forced to absorb unnecessary overhead expenses, which may not be directly billable to the subscriber.

BRIEF SUMMARY OF THE INVENTION

Embodiments of the invention provide novel solutions, including systems, methods and/or software, for providing handoffs between cellular providers and VoIP providers. In some cases, for example, upon the initiation of a call from a dual-mode cellular phone, the cellular network (and/or a component thereof) may be configured to store the dialed number and/or substitute a predetermined number for the dialed number. The predetermined number may be associated with a VoIP provider's system. Hence, in a particular embodiment, the call may be routed (e.g., via the PSTN) to the VoIP provider's system, which may be configured to obtain (perhaps from an application server) the original dialed number and/or to route the call (e.g., via the PSTN) to the original dialed number. If the dual-mode phone subsequently obtains IP access, a VoIP connection may be established between the VoIP system and the phone and/or a handoff may be performed (e.g., in the VoIP system) to transfer the call from the cellular connection to the VoIP connection. Optionally, the cellular connection may be terminated.

One set of embodiments provides methods of handling calls placed by dual-mode phones. An exemplary method, which may be implemented in a telecommunications system comprising a cellular system and a VoIP system, may comprise a cellular system (and/or a component thereof, such as an MSC, etc.) receiving a call originating from a phone registered with the cellular system. The call may be associated with a destination number identifying a destination for the call. The method may further comprise obtaining a forwarding number associated with a VoIP system, storing the destination number, and/or forwarding the call to the forwarding number. This may establish a connection between the cellular system and the VoIP system, such that the VoIP system can be used to connect the call with the destination. Hence, the stored destination number may be obtained and/or the call may be connected with the destination (e.g., by the VoIP system).

In some embodiments, the method may further comprise recognizing that the call has originated from a phone requiring special call handling and/or activating an origination attempt trigger associated with the phone.

In a particular set of embodiments, the method may comprise determining that the phone has connected with an IP network and/or performing a cellular-to-VoIP handoff, such that the call is connected with the phone via the IP network.

Another exemplary method, which may be implemented in a VoIP system, may comprise accepting a connection with a cellular system. The connection may comprise a call originating from a phone registered with the cellular system. The method may further comprise obtaining a destination number, which may include identifying a destination for the call, and/or connecting the call with the destination. In addition, the method may further comprise determining that the phone has connected with an IP network and/or performing a cellular-to-VoIP handoff, such that the call is connected with the phone via the IP network. The handoff may comprise performing transmitting a SIP invite for reception by the phone.

In some cases, the connection with the cellular system may be disconnected, such that the call is handled by the VoIP system and the call is no longer handled by the cellular system. In a particular set of embodiments, the handoff may comprise forking the call, such that the VoIP system simultaneously maintains the connection between the cellular system and a VoIP connection with the phone via the IP network.

Another set of embodiments provides systems for handling calls made by dual-mode phones, including without limitation systems configured to perform methods of the invention. An exemplary system may comprise an MSC and/or an SCP. The MSC may be configured to receive a call originating from a phone registered with the cellular network. The call may be associated with a destination number identifying a destination for the call. The MSC might be further configured to transmit a message requesting a forwarding number associated with a VoIP system and/or to forward the call to the forwarding number associated with the VoIP system.

The SCP, which may be in communication with the MSC, may be configured to receive a message requesting a forwarding number associated with a VoIP system. The SCP may be further configured to obtain the forwarding number associated with the VoIP system. The SCP may then transmit the forwarding number for reception by the MSC.

Another exemplary system may comprise an MSC, which might be configured similarly to the MSC described above. In some embodiments, the system might further comprise a VoIP system, which may be configured to receive the forwarded call, obtain the destination number and/or connect the call with the destination.

An exemplary VoIP system in accordance with some embodiments might comprise a VoIP switch, which might comprise a processor and instructions. The instructions may be executable by the processor to accept a connection with a cellular system. The connection may comprise a call originating from a phone registered with the cellular system. In some embodiments, the instructions are further executable to obtain a destination number (perhaps in response to a termination attempt trigger), which might include identifying a destination for the call. The instructions might be further executable to connect the call with the destination, to determine that the phone has connected with an IP network, and/or to perform a cellular-to-VoIP handoff, such that the call is connected with the phone via the IP network.

In a set of embodiments, the VoIP system further comprises a device in communication with the VoIP switch. The device (which might be, inter alia, an SCP and/or an application server), may be configured to receive a message from the VoIP switch (which might be a request for the destination number), to obtain the destination number, and/or to transmit the destination number for reception by the VoIP switch.

The VoIP switch might be further configured to fork the call, such that the VoIP system simultaneously maintains the connection between the cellular system and a VoIP connection with the phone via the IP network and/or to disconnect the connection with the cellular system. In another set of embodiments, the VoIP switch might be configured to disconnect the connection between the VoIP system and the cellular system, such that the call is handled by the VoIP system and the call is no longer handled by the cellular system.

Yet another set of embodiments provides software programs for handling calls from dual-mode phones, including without limitation software comprising instructions to perform methods of the invention. An exemplary program, which could be embodied on one or more computer readable media, comprises instructions executable by one or more computers to accept a connection with a cellular system. The connection might comprise a call originating from a phone registered with the cellular system. The program might include further instructions to obtain a destination number, which may identify a destination for the call, and/or to connect the call with the destination. In a set of embodiments, the program comprises further instructions to determine that the phone has connected with an IP network; and/or to perform a cellular-to-VoIP handoff, such that the call is connected with the phone via the IP network. In some cases, the instructions are also executable to disconnect the connection between the VoIP system and the cellular system, such that the call is handled by the VoIP system and the call is no longer handled by the cellular system, and/or to fork the call, such that the VoIP system simultaneously maintains the connection between the cellular system and a VoIP connection with the phone via the IP network.

DETAILED DESCRIPTION OF THE INVENTION

Embodiments of the invention provide novel solutions, including systems, methods and/or software, for providing handoffs between cellular providers and VoIP providers. In some cases, for example, upon the initiation of a call from a dual-mode cellular phone, the cellular network (and/or a component thereof) may be configured to store the dialed number and/or substitute a predetermined number for the dialed number. The predetermined number may be associated with a VoIP provider's system. Hence, in a particular embodiment, the call may be routed (e.g., via the PSTN) to the VoIP provider's system, which may be configured to obtain (perhaps from an application server) the original dialed number and/or to route the call (e.g., via the PSTN) to the original dialed number. If the dual-mode phone subsequently obtains IP access, a VoIP connection may be established between the VoIP system and the phone and/or a handoff may be performed (e.g., in the VoIP system) to transfer the call from the cellular connection to the VoIP connection. Optionally, the cellular connection may be terminated.

As used herein, the term "cellular" should be interpreted in a broad sense to include any of the variety of known modes of wireless and/or mobile communications. Exemplary cellular systems include, but are not limited to time division multiple access ("TDMA") systems, code division multiple access ("CDMA") systems, such as those used by many wireless providers in the United States, global system for mobile communications ("GSM") systems used by many providers in Europe and Asia, as well as some providers in the United States. Other exemplary cellular systems include systems known in the art as "3G" systems and/or Enhanced Data Rates for GSM Evolution ("EDGE") systems, iDEN-based systems, satellite-based cellular systems and/or the like.

The term "VoIP" as used herein should be interpreted to mean any type of voice service that is provided over a data network, and in particular over an Internet Protocol-based network (of which the Internet is but one example). A phone capable of VoIP mode communications may be configured to use the session initiation protocol ("SIP"), the H.323 protocol, the Inter-Asterisk Exchange ("IAX" or "IAX2") and/or any other protocol designed to allow voice communications over data and/or IP networks.

Embodiments of the invention, then, provide for efficient call handling for "dual mode" phones; that is, phones that are capable of operating in a cellular mode and in a VoIP mode. (It should be noted that, while this document refers generally to "phones," embodiments of the invention may be implemented to provide service to any device that may operate in a dual mode as described herein, including merely by way of example, computers (including, inter alia, laptop computers), perhaps with cellular modems, personal digital assistants, and/or the like. Those skilled in the art will appreciate based on the disclosure herein, that a variety of devices may be configured to use cellular and/or VoIP communications, and that embodiments of the invention correspondingly may be used with any such devices). Various manufacturers have begun manufacturing such phones (or have plans to do so); often, the phones are configured to operate as a standard cellular telephone and also have some data transmission capability. Merely by way of example, such phones may be configured to accept a data cable for communication with a computer, may have one (or more) of a variety of wireless transmitters and/or receivers (such as Bluetooth transceivers, WiFi/WiMax transceivers, 802.11x transceivers, 802.16x transceivers, etc.). Virtually any mode of data communication between the phone and a network may be used in accordance with embodiments of the invention; in particular embodiments, the phone's data communication capabilities will support IP communication, which in turn will support VoIP communication.

Figure 1:
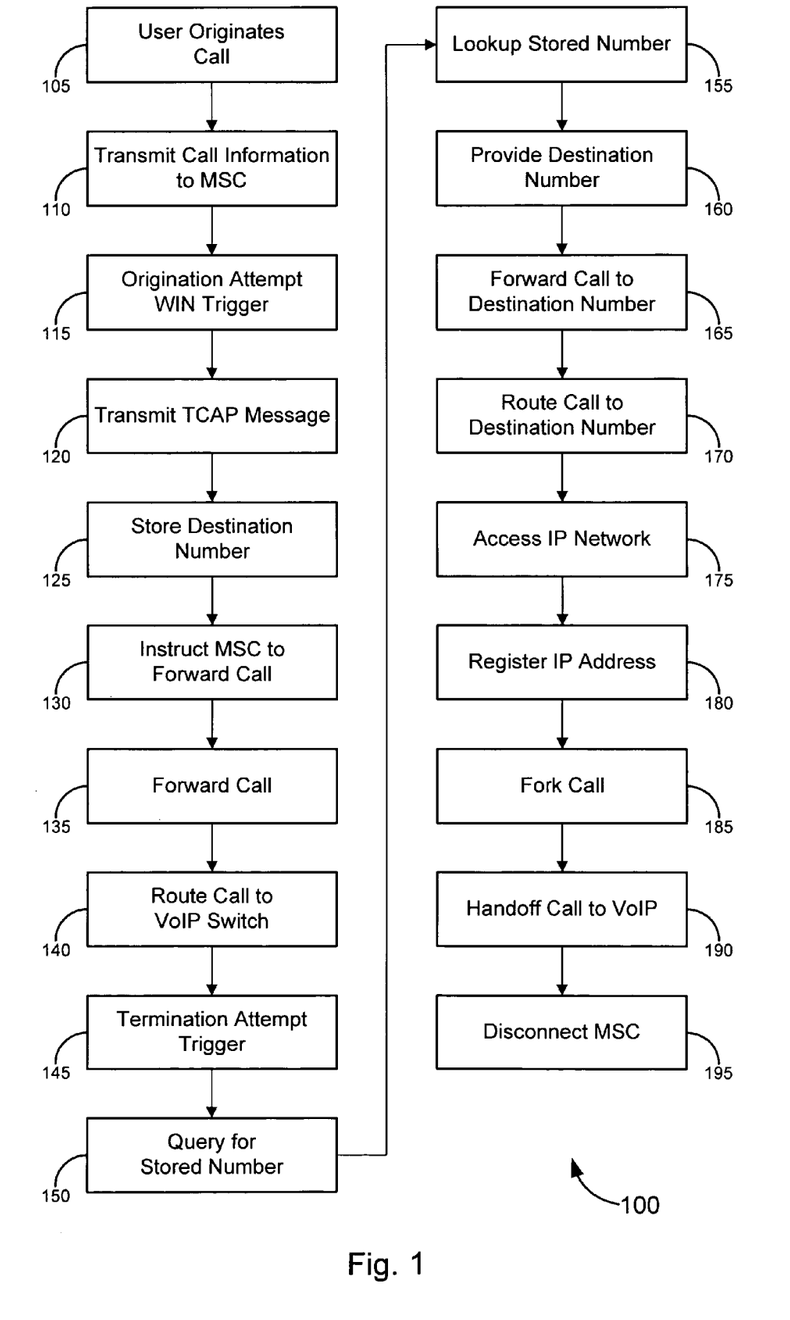
FIG. 1 illustrates a method of handling a cellular call in a VoIP environment, in accordance with various embodiments of the invention.
Figure 2A:
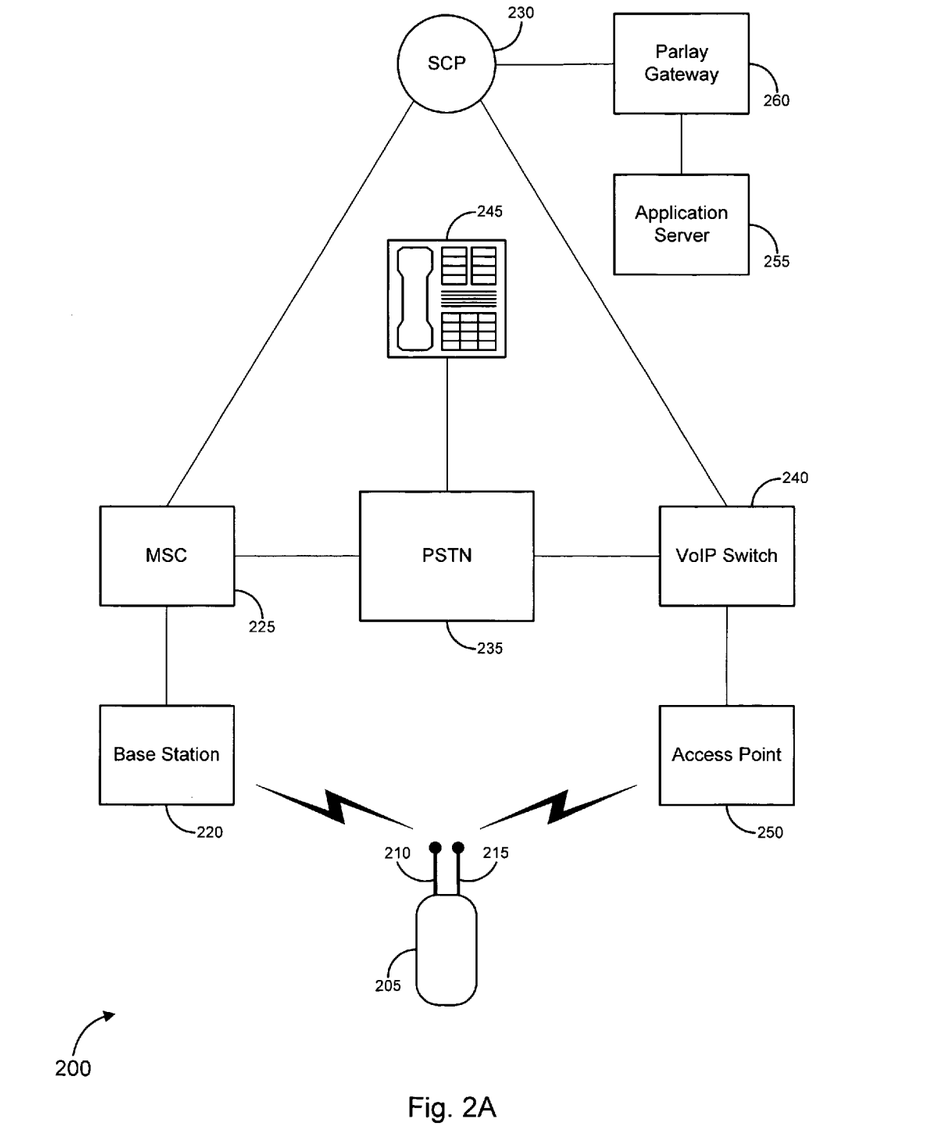
FIG. 2A illustrates a telecommunications system that can be configured to handle a cellular call in a VoIP environment, in accordance with various embodiments of the invention.

FIG. 1 illustrates a method 100 of handling calls in according with a set of embodiments. Another set of embodiments provides systems for handling calls, an example of which is illustrated by FIG. 2A. The method 100 of FIG. 1 may be (but need not be) performed by a system such as the system 200 illustrated by FIG. 2A.

The system 200 may comprise a cellular phone 205 which may be configured to operate as a dual mode phone. Accordingly, the phone 205 may comprise any equipment necessary for communicating with a cellular network and/or a VoIP network. Such components are known in the art and need not be described in detail herein. It is sufficient for purposes of this document to note that the phone 205 may comprise a cellular transmitting/receiving apparatus 210 (which may comprise one or more transmitters, receivers, processors, antennas, etc.) and/or a VoIP transmitting/receiving apparatus 215 (which may comprise one or more a wireless transmitters, receivers, processors, and antennas, receptacles for accepting a wired connection, etc. Merely by way of example, a phone that may be used with embodiments of the present invention may provide connectivity via 802.11a/b/g and CDMA/GSM. Motorola Corp. has announced plans to produce such phones. The phone may have a single, PSTN-routable phone number that can be used to place both cellular and VoIP calls.

The system 200 may also feature one or more standard cellular network components known in the art, such as a base station 220 and/or other device for providing communication between the phone 205 and the cellular system. The base station 220 may be in communication with a mobile switching center ("MSC") 225, of which a variety are commercially available. In a particular set of embodiments, the MSC 225 may be configured to allow for the implementation of wireless intelligent network ("WIN") triggers and/or other triggers known in the art. An example of such a trigger is an origination attempt trigger, which is activated when the phone 205 attempts to originate a call using the cellular system. Although additional customization of the MSC 225 may be appropriate in some embodiments, other embodiments may utilize an MSC with standard configuration and/or programming.

The MSC 225 may be in communication with a signal control point ("SCP") 230, another cellular network component well known to those skilled in the art. As described in more detail below, the SCP 230 may be modified to operate in accordance with embodiments of the invention. In a particular set of embodiments, the MSC 225 may communicate with the SCP 230 using, inter alia, transaction capabilities application part ("TCAP") messages, including for example TCAP requests.

To provide connectivity between cellular subscribers (e.g., a user of the phone 205 illustrated in FIG. 2A), the MSC 225 may also be in communication with a telephone network such as the public switched telephone network ("PSTN") 235. (Those skilled in the art will appreciate that there may be additional devices that intermediate communications between a base station 220, MSC 225, SCP 230 and PSTN 235. Such devices may include signal switching points ("SSP"), signal transfer points ("STP") and/or other devices common to phone networks, and in particular to advanced intelligent networks ("AIN") and/or WINs. The topology and configuration of such devices and networks is well-known and need not be described here in detail.)

One or more VoIP systems may also be in communication with the PSTN 235 (and/or directly in communication with the cellular system). In a particular set of embodiments, a VoIP system may comprise a VoIP switch 240. Many different VoIP switches are commercially available from vendors such as 3Com, Cisco, Nortel, Sonus, Sylantro, BroadSoft, Lucent and others. In a set of embodiments, the VoIP switch 240 may be a softswitch, which may provide for distributed PSTN gateway and call handling functionality among a plurality of devices and/or locations. As part of a softswitch (and/or as a separate component), the system 200 may also include one or more application servers 255. The application server(s) 255 may be used to provide advanced functionality in a cellular network and/or AIN. In particular, an application server 255 may be used to provide call handling instructions (e.g. to an MSC 225 and/or to a VoIP switch 240) in accordance with embodiments of the invention. In some cases, the application server 255 may be in communication with an SCP 230, e.g., via SS7 communications, EP communications, etc. This communication may be direct and/or indirect. Merely by way of example, communication between the SCP 230 and the application server 255 may be handled by a parlay gateway 260, which may conform to the Parlay/OSA API known in the art. Alternatively, the SCP 230 may be configured to provide some call handling instructions, and/or the application server 255 and/or parlay gateway 260 may be omitted from some embodiments. In some embodiments, the SCP 230 may comprise and/or be integrated within the application server 255.

In a set of embodiments, the parlay gateway 260 and/or the application server 255 may also be in communication with the VoIP switch 240 (e.g., via SIP communications, triggers, etc.). In another set of embodiments (for example, as illustrated by FIG. 2A), the VoIP switch 240 may be in communication with the SCP 230 (and/or may obtain necessary information and/or instructions from the application server 255 via the SCP 230).

The VoIP system (and in particular cases, the VoIP switch 240) may be in communication with an access point 250, which can provide communication with the phone 205 (e.g., via an IP connection). While the VoIP system may have direct communication with the access point 250, such communication often occur over an IP network, such as the Internet, a private network, etc. The access point 250 can be any device that provides IP connectivity with the phone 250. Examples include wireless access points ("WAP"), Bluetooth transceivers; Ethernet hubs, switches and/or routers; broadband gateways, etc.

Figure 2B:
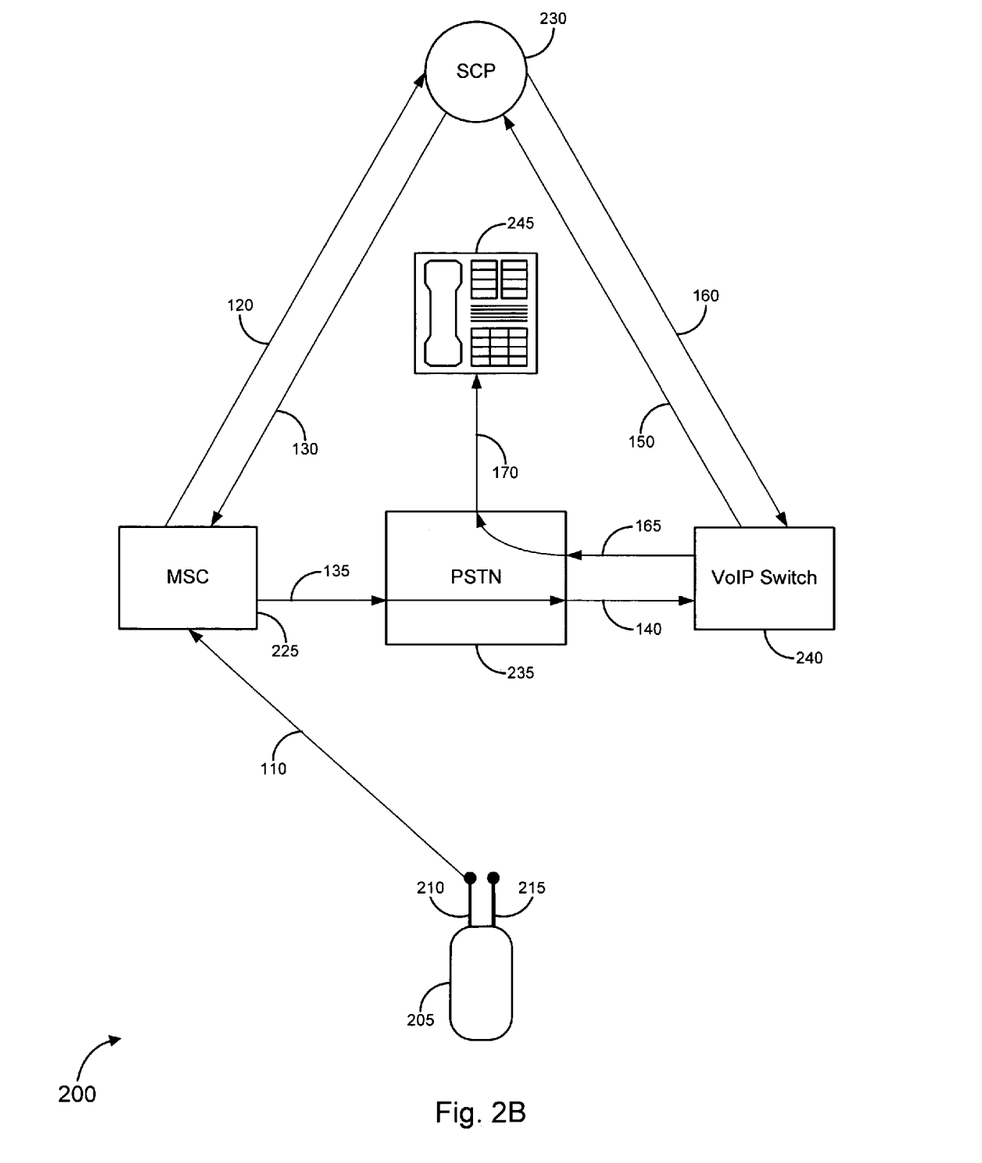
FIGS. 2B-2E illustrate the functioning of the telecommunications system of FIG. 2A, in accordance with various embodiments of the invention.
Figure 2C:
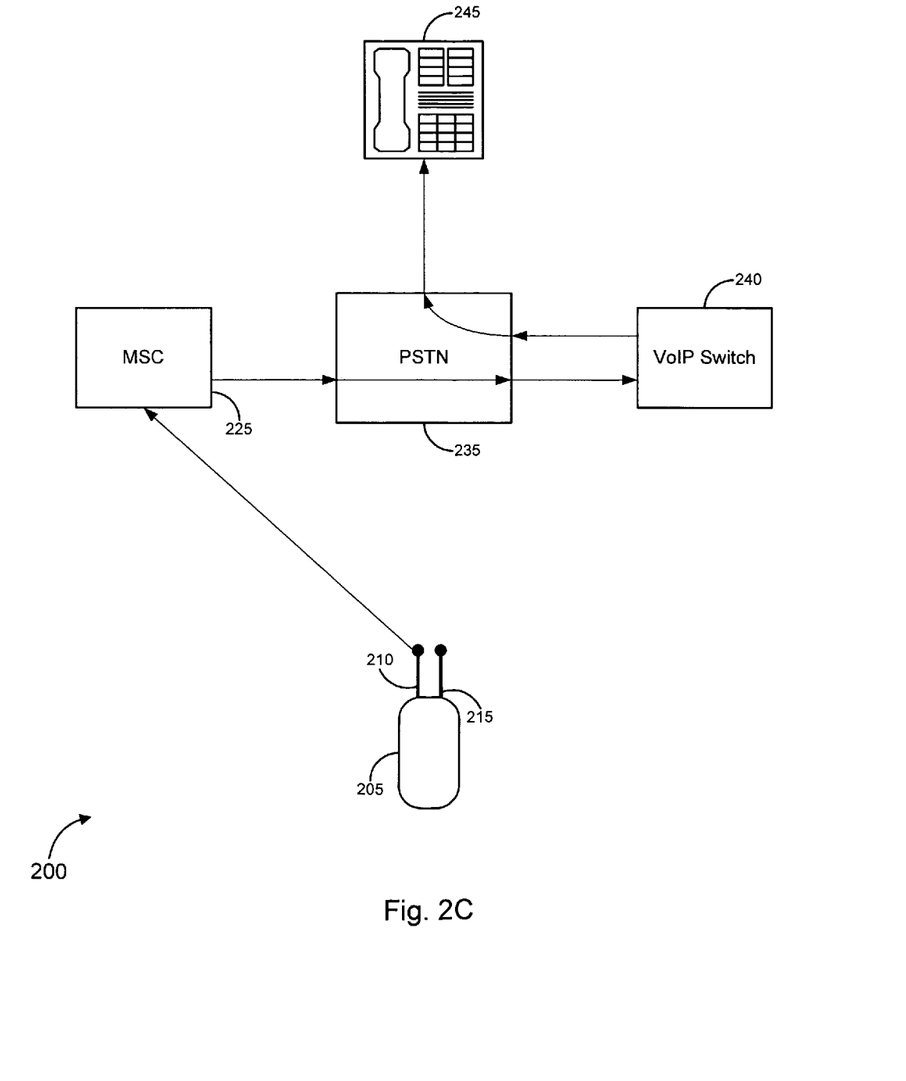
Figure 2D:
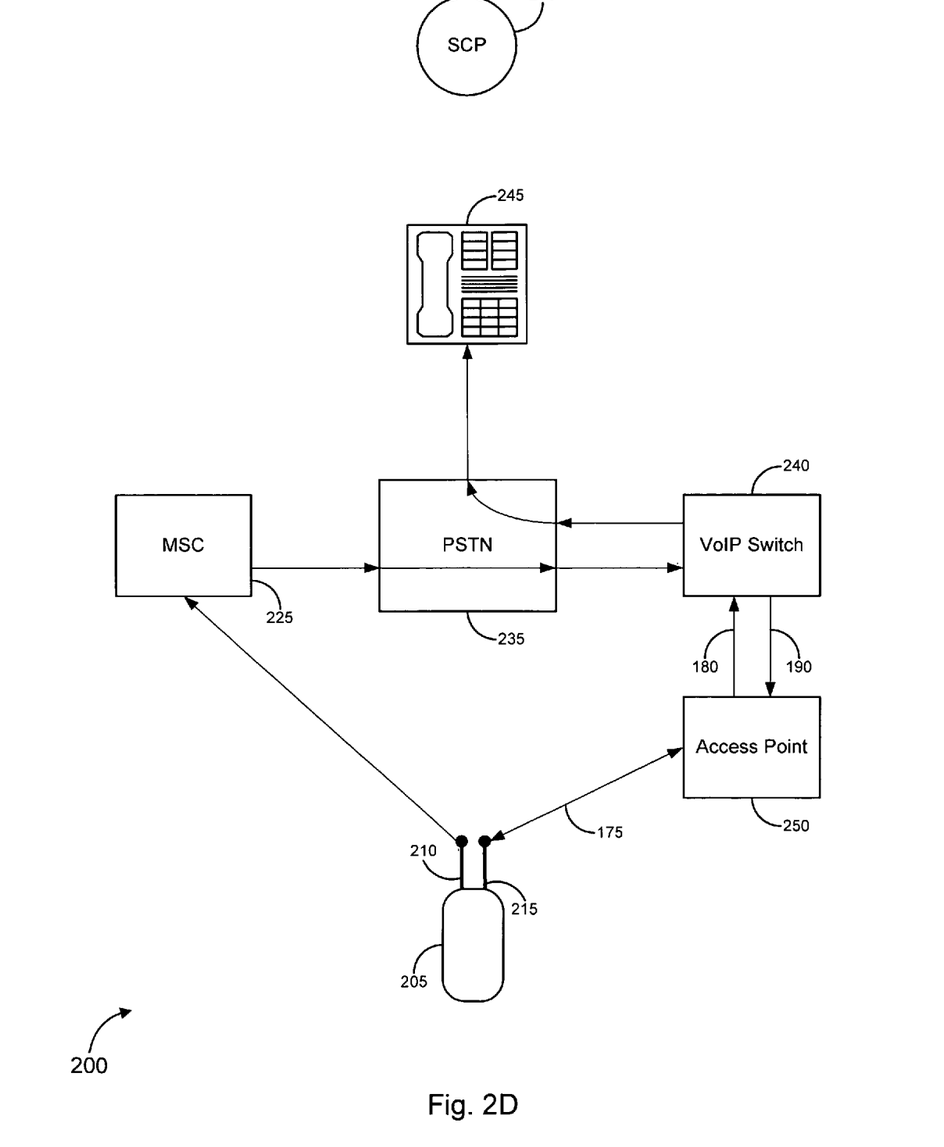

FIGS. 2B-2D illustrate the system 200 of FIG. 2A operating in accordance with the method 100 of FIG. 1, and the method 100 will be described with respect to these figures. (It should not be inferred, however, that methods of the invention necessarily are implemented using the exemplary system 200 of FIG. 2—the method 100 of FIG. 1 may be implemented independently of any specific hardware configuration).

At block 105, a subscriber attempts to originate a call via a cellular network to a destination (using a destination number associated with that destination). This step usually involves the subscriber dialing the destination number and pressing a "send" key on the phone 205. In response, the phone transmits call information (generally including, inter alia, the destination number, as well, perhaps as the calling number of the phone 205 and/or some other information sufficient to identify the phone 205 to the MSC) in conventional fashion to a base station 220, (block 110), which forwards the call information to an MSC 225. The MSC 225 may be configured to recognize the phone 205 (based, for example, on the call information and/or a subset thereof) as part of a group that requires special call processing. Hence, the call information may activate an origination attempt trigger at the MSC 225 (block 115).

The MSC 225, in many cases, will be configured, perhaps in response to the origination attempt trigger, to request instructions from a controlling device, such as an SCP 230 and/or application server 255 (block 120). This message may be in the form of a TCAP request. The TCAP request may also include the destination number. The destination number may be stored (block 125), e.g., in a database associated with an SCP 230, application server 255, MSC 225, etc. Other identifying information about the call (such as the calling number—the number of phone 205—a timestamp and/or call identifier) may also be stored and/or may be used to look up the destination number (as described below, for example). The controlling device (e.g., the SCP 230, application server 255, etc.) then may instruct the MSC 225 to forward the call to a number associated with the VoIP system, and/or more particularly, with a VoIP switch 240 (block 130). In some cases, this forwarding instruction may simply be the substitution by the SCP 230 of the forwarding number for the destination number.

The MSC 225, then, may forward the call to the VoIP switch 240 in a conventional manner (block 135). Based on the disclosure herein, one skilled in the art will appreciate that often the PSTN 235 will be used to route the forwarded call (block 140). Merely by way of example, a trunk connection, well known in the art, may be used to forward the call from the MSC 225 to the VoIP switch 240. In an alternative embodiment, the MSC 225 (and/or another component of the cellular system) may have a direct (i.e., not via the PSTN 235) connection with the VoIP switch 240. In such case, the MSC 225 may transfer the call directly to the VoIP switch 240 (perhaps based on an origination attempt trigger), and/or it may not be necessary for the MSC 225 to use a forwarding number.

Upon receiving the forwarded call, the VoIP system (and/or more particularly, the VoIP switch 240) may obtain the destination number (that is, the number associated with the destination the subscriber is attempting to contact). This process may be accomplished in a variety of ways. Merely by way of example, in some embodiments, the destination number may be transmitted by the cellular system (and/or a component thereof, such as the MSC 225), perhaps using in-band and/or out-of-band signaling as part of the forwarded call. Merely by way of example, the MSC 225 may be configured to stuff the destination number in one or more fields of an SS7 message to the VoIP switch 240, and/or DTMF tones (from the MSC and/or the subscriber) may be used to notify the VoIP switch 240 in-band of the destination number. In another set of embodiments, the reception of the forwarded call may activate a termination attempt trigger at the VoIP switch (block 145). The VoIP switch may then obtain the destination number (i.e., the number originally dialed by the subscriber) in response to the termination attempt trigger.

In some embodiments (for instance when the destination number is stored by an SCP and/or application server), the VoIP switch 240 may issue a query request for the stored destination number (block 150). For instance, the VoIP switch 240 may issue a query to an SCP 230 and/or application server 255 for the destination number (perhaps using an SS7 communication, such as a TCAP message, and/or an IP communication, such as a SIP communication, an XML communication, etc.). The query might key on a calling number, timestamp and/or other identifier, which may be stored with the destination number as described above. In some cases, the SCP 230 may have stored the number, and/or it may perform a database lookup for the number (block 155). In other cases, the destination may have been stored at an application server 255, and/or the SCP 230 may issue a request to the application server 255 for the destination number, perhaps via a parlay gateway 260, in a manner known in the art. Alternatively and/or additionally, the VoIP switch 240 may directly query the application server 255 for the destination number (e.g., in implementations where the VoIP switch 240 is in communication with the application server 255), perhaps via an IP communication, which again might be a SIP communication, an XML communication, an H.323 communication, etc. The SCP 230, application server 255 and/or any other appropriate device then may provide the destination number to the VoIP switch 240 (block 160) (e.g., using a SIP communication, an SS7 communication and/or any other appropriate type of communication).

Regardless of how the VoIP switch 240 obtains the destination number, the VoIP switch 240 then may forward the call to the destination 245 (block 165). Once again, this forwarded call may be routed via the PSTN 235 as appropriate (block 170). This routing may be performed as if the subscriber had dialed the destination number from a VoIP connection originally. Hence, in some embodiments, the VoIP switch 240, not the cellular system, may be responsible for call control functions. Alternatively, and/or in addition, this could be implemented as a VoIP application on a wireless data connection. FIG. 2B illustrates the communication flow for blocks 105-170 using the system 200 of FIG. 2A, in accordance with some embodiments of the invention. FIG. 2C illustrates the call flow in the system 200 once the call has been routed from the MSC 225 to the VoIP switch 240 and terminated at the destination 245. The transmission path runs from the phone 205 to the MSC 225, through the PSTN 235 to the VoIP switch 240, back through the PSTN 235 and to the destination 245.

FIG. 2D illustrates the remaining steps of the method 100 of FIG. 1 as they might be implemented in the system 200 in some embodiments. At block 175, the phone 205 accesses an IP network (which, again, might be a private network, the Internet, etc.). Accessing an IP network might comprise plugging the phone into an Ethernet network in communication with the Internet, taking the phone within range of a Bluetooth network in communication with the Internet, etc. In a particular set of embodiments, for example, the phone 205 might enter into range of a WiFi or WiMax hotspot and/or access point 250. This process might involve subscriber interaction and/or might be performed automatically by the phone 205 (merely by way of example, the phone 205 might listen periodically and/or constantly for WiFi transmissions from an access point 250, etc.).

Upon accessing the IP network, the phone 205 may register its IP address to the VoIP system (and/or the VoIP switch 240) (block 180) and/or otherwise identify itself to the VoIP switch 240. The process of registration may vary from implementation to implementation. For example, in some cases, the subscriber might take an affirmative action to instruct the phone 205 to perform this registration, while in other cases, the phone might be configured to register automatically upon obtaining IP access. In still other cases, the VoIP system may be configured to poll periodically for the phone 205, and/or the VoIP system may register the phone 205 when detected.

Upon registering the phone 205, the VoIP switch 240 typically will identify the phone 205 as a participant in a call being handled by the VoIP switch 240. For example, when the phone 205 registers with the VoIP switch 240, the switch 240 typically will identify the phone 205 (e.g., by phone number and/or another identifier). The VoIP switch 240 might then check a database of current calls for any calls involving the phone 205 (which would identify the call established earlier). The VoIP switch may then transition the call from a cellular call to a VoIP call. In a set of embodiments, this transition may comprise forking the call (block 185). In forking the call, the VoIP switch 240 effectively maintains the connection with the phone 205 through the cellular network (i.e., through the MSC 225 and/or the base station 220 and the phone's cellular transmitting/receiving apparatus 210) and through a VoIP connection (i.e., through the access point and the phone's VoIP transmitting/receiving apparatus 215).

For example, the VoIP switch 240 might attempt to terminate the forked call to the phone 205 via the IP connection (e.g., with a SIP invite). Upon receiving the termination attempt, the phone 205 might be configured to recognize that the termination attempt relates to the call currently being carried on via the cellular network. The phone then might accept the termination attempt (this may be performed automatically and/or upon prompting by the user, based perhaps on a notification, such as a tone, display, etc., by the phone to the subscriber that a VoIP connection is available for the call). It is anticipated that common dual-mode phones will have the ability to handle VoIP and cellular calls simultaneously, allowing the phone to receive both "forks" of the call.

The VoIP switch 240 will then handoff the call from the cellular network to the VoIP network (block 190) (e.g., the IP connection with the phone 205). If the VoIP switch is able to fork the call (as described above), this handoff may be relatively seamless to the subscriber. Otherwise, there may be a relatively short pause while the handoff is performed.

In a set of embodiments, once the VoIP switch 240 has handed off the call to the VoIP network, the cellular network (or more particularly, in some cases, the MSC 225) may be disconnected (block 195). In some cases, the phone 205 might be configured to automatically disconnect the cellular connection after the VoIP connection has been established. Alternatively and/or in addition, the VoIP switch 240 may be configured to disconnect the call, such that, to the cellular network, it may appear that the destination 245 has disconnected the call, and the MSC 225 then will tear down its connection with the phone 205 (and, as necessary, with the VoIP switch 240), ending the call from the point of view of the cellular network.

Figure 2E:
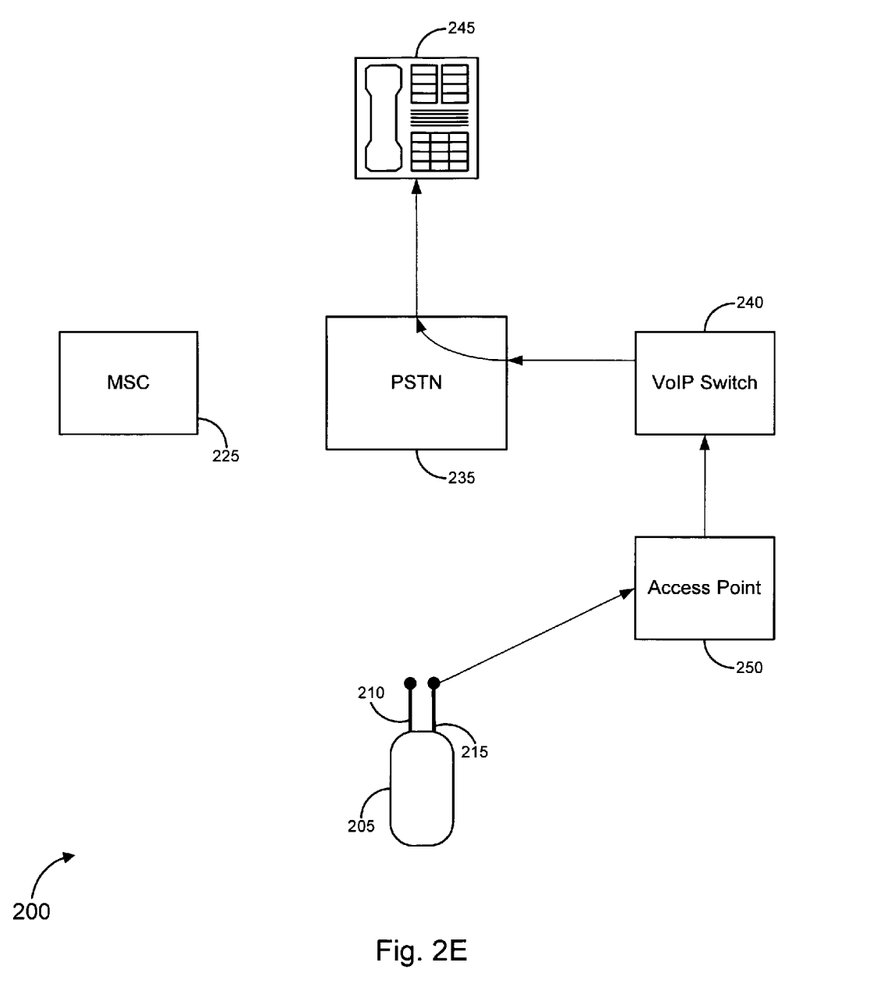

FIG. 2E illustrates the call flow once the cellular network has been disconnected. The transmission path runs from the phone 205 to the VoIP switch 240 (generally through an IP network and/or an access point 250, as described above), through the PSTN 235 to the destination 245. Hence, in accordance with some embodiments of the invention, the subscriber no longer is subject to cellular charges, the VoIP provider no longer is subject to charges related to the connection with the MSC 225 (e.g., a trunk connection, etc.), and the MSC 225 regains the use of the port(s) previously occupied by the call.

As noted above, alternative hardware configurations may be utilized in some embodiments of the invention. Merely by way of example, FIGS. 3A and 3B illustrate two alternative configurations, although others are possible as well.

Figure 3A:
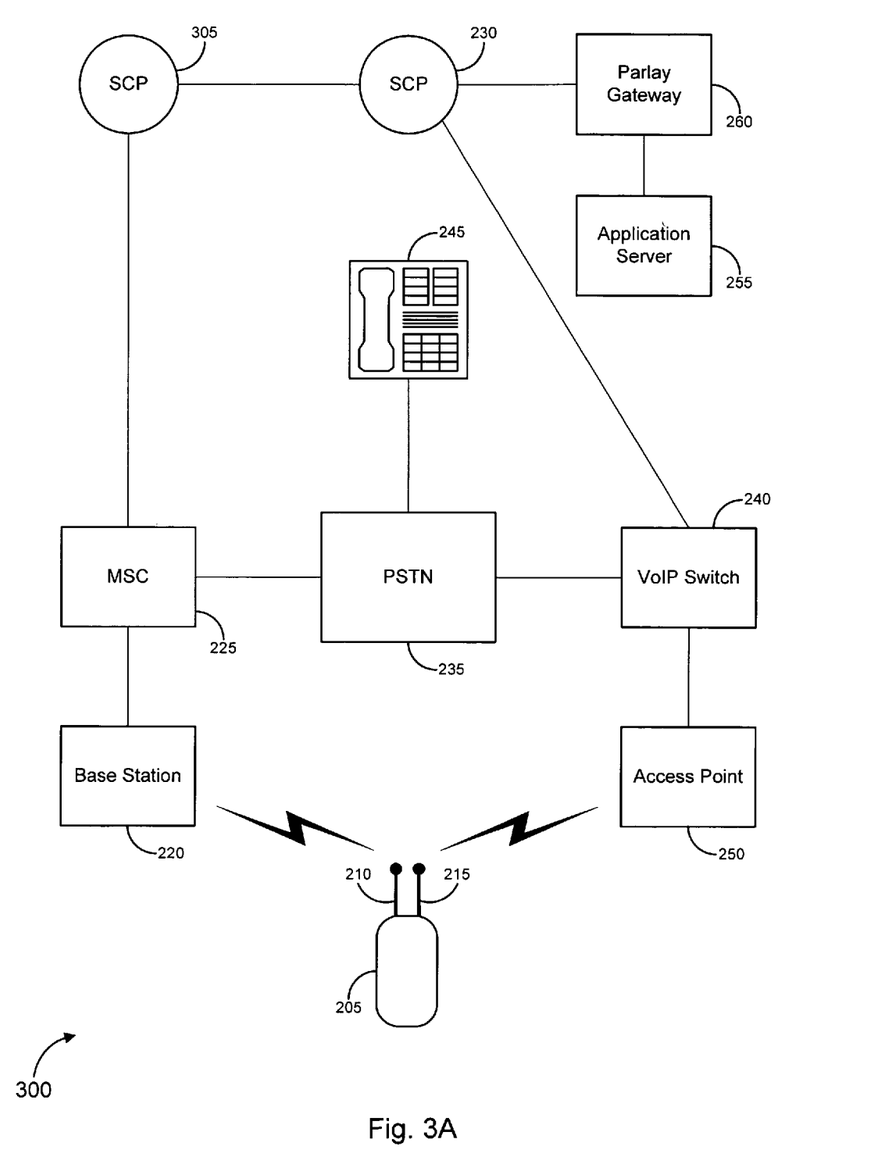
FIGS. 3A and 3B illustrate alternative configurations of a telecommunications system, in accordance with various embodiments of the invention.

FIG. 3A illustrates a system 300 similar to the system 200 of FIG. 2A, except that the system 300 includes an additional SCP 305. For instance, in some embodiments, the SCP 230 may be operated as part of the cellular network (and/or another network, which may be operated by the cellular provider). As such, the SCP 230 may not be configured to operate in accordance with the invention (e.g., it may not be configured to store a destination number, provide a destination number to the VoIP switch 240, etc.). Accordingly a second SCP 305 may be in communication with the SCP 230 (perhaps through one or more intermediary devices such as STPs, etc.) and/or the second SCP 305 may be configured to perform as the SCP 230 described with respect to FIGS. 1 and 2A-2B. In the system 300 of FIG. 3A, then, the first SCP 230 may simply pass relevant communications, e.g., from the MSC 225 (TCAP messages, etc.) to the SCP 305, which may then respond accordingly, perhaps via the first SCP 230. The second SCP 305 may also be in communication with the VoIP switch 240 (directly and/or via the first SCP 230 and/or via any appropriate intermediate devices) and/or may be equipped to handle requests from the VoIP switch 240.

Figure 3B:
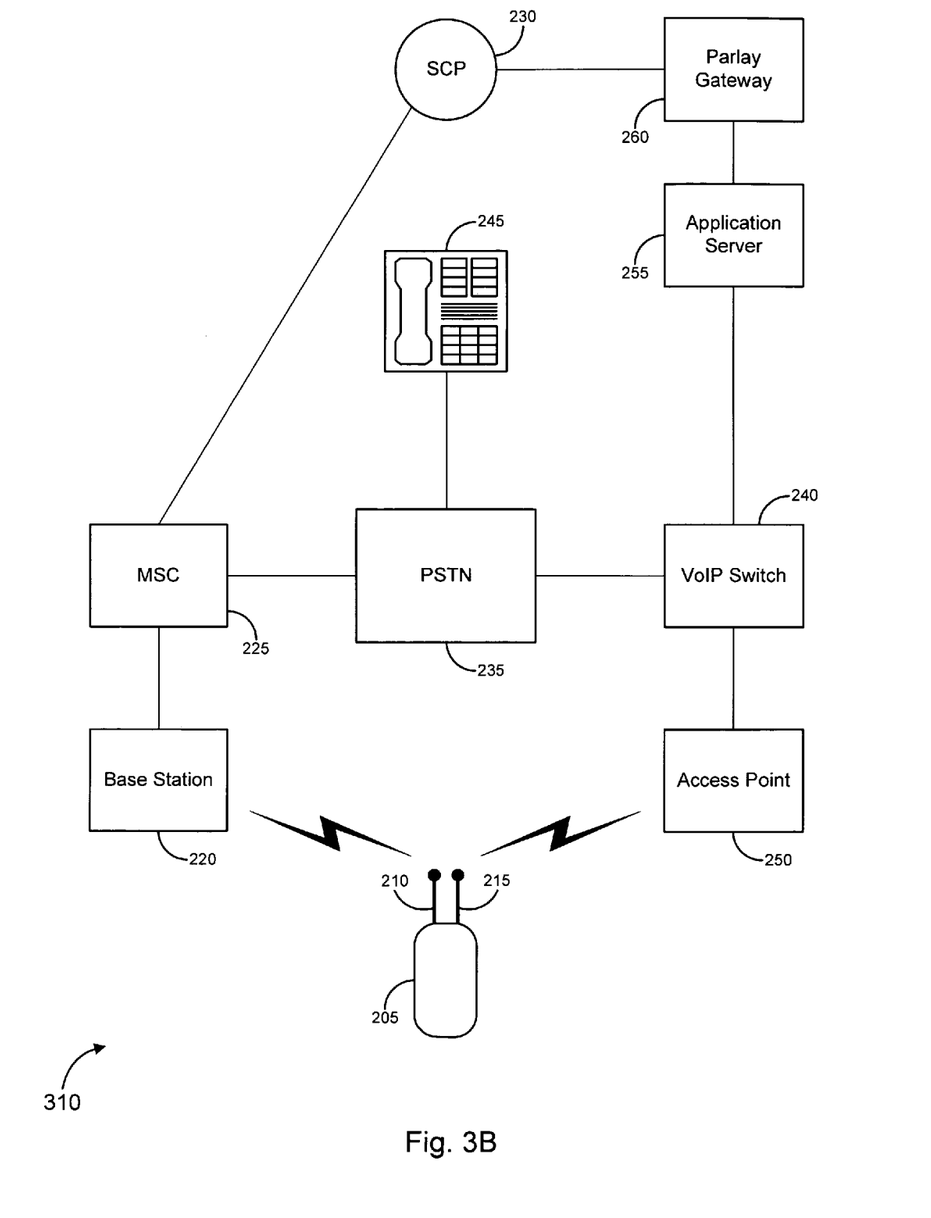

FIG. 3B illustrates another exemplary system 310 having another alternative configuration. In the system 310, the SCP 230 might not be configured to communicate (e.g., via SIP, etc.) with the VoIP switch 240. Accordingly, the application server 255 might be configured to communicate directly with the VoIP switch 240, e.g., through any appropriate path (the Internet, a dedicated connection, using intermediary devices such as routers, etc.). As noted above, a parlay gateway 260 might provide communication between the application server 255 and the SCP 230. Hence, the application server 255 might be operated by the VoIP provider, and/or the parlay gateway 260 might provide secured communication with the SCP 230, which might be operated by the cellular provider (or another). Such arrangements are familiar to those skilled in the art.

Figure 4:
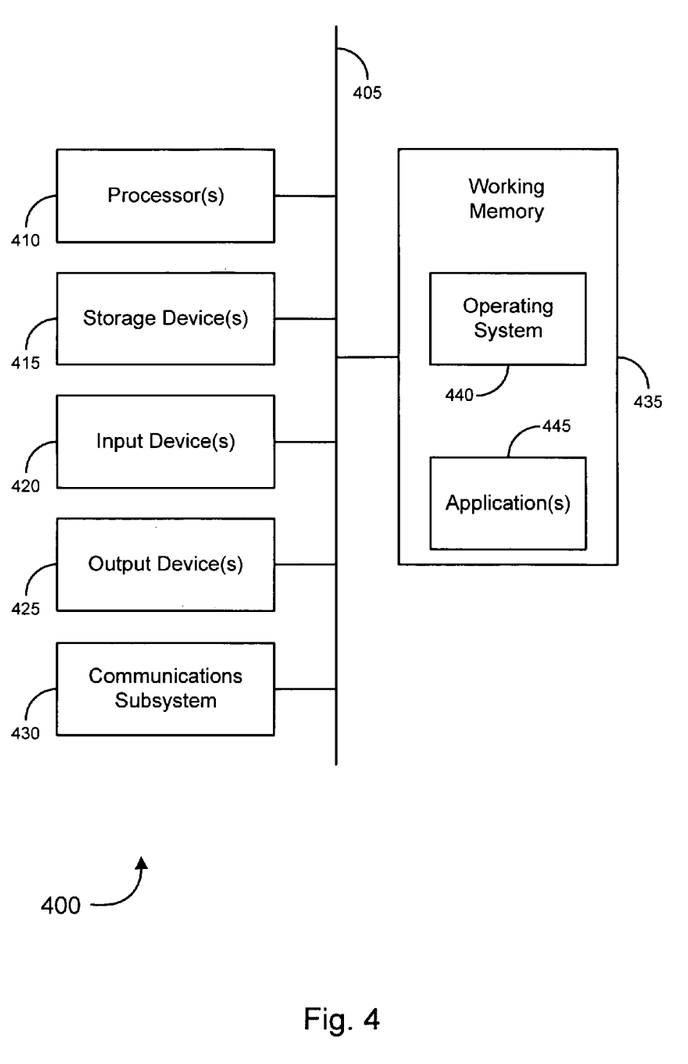
FIG. 4 is a generalized schematic drawing illustrating a computer system that may be used in accordance with various embodiments of the invention.

In the embodiments described above, standard equipment may be used, perhaps with modification as necessary to function in accordance with embodiments of the invention. Merely by way of example, a standard MSC, SCP, application server, parlay gateway, etc. may be used. In some cases, general computers may also be used to perform the functions of one or more of these devices (e.g., an application server, VoIP softswitch, etc.) FIG. 4 provides a generalized schematic illustration of one embodiment of a computer system 400 that can perform the methods of the invention and/or the functions of such devices, as described herein. FIG. 4 is meant only to provide a generalized illustration of various components, any of which may be utilized as appropriate. The computer system 400 can include hardware components that can be coupled electrically via a bus 405, including one or more processors 410; one or more storage devices 415, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 405 can be one or more input devices 420, which can include without limitation a mouse, a keyboard and/or the like; one or more output devices 425, which can include without limitation a display device, a printer and/or the like; and a communications subsystem 430, which can include without limitation a modem, a network card (wireless or wired), an infra-red communication device, and/or the like. In some cases, the communication subsystem 430 may include specialized hardware familiar to those skilled in the art, such as switching fabric and/or ports, fiber cards, etc.

The computer system 400 also can comprise software elements, shown as being currently located within a working memory 435, including an operating system 440 and/or other code 445, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

It should be noted that the methods discussed with respect to FIG. 1 are intended to be only exemplary in nature. Consequently, various embodiments may omit, substitute and/or add various procedures as appropriate. It should be appreciated that in alternative embodiments, the methods may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices (such as an MSC, SCP, application server, VoIP switch, etc.). Alternatively, the methods may be performed by a combination of hardware and software.

In conclusion, the present invention provides novel solutions for handling calls, particularly in a mixed-mode cellularNoIP environment. While detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. In a telecommunications system comprising a cellular system and a voice over Internet Protocol ("VoIP") system, a method for handling a call placed by a dual-mode phone capable of operating in a cellular mode and in a VoIP mode, the method comprising:

the cellular system receiving the call placed by the dual-mode phone registered with the cellular system, wherein the call is associated with a destination number identifying a destination for the call, and wherein the dual-mode phone is configured to communicate with the cellular system via a cellular connection between the dual-mode phone and the cellular system and to communicate with the VoIP system via an Internet Protocol ("IP") connection, separate from the cellular system, between the dual-mode phone and the VoIP system;

the cellular system obtaining a forwarding telephone number of the VoIP system;

the cellular system storing the destination number;

forwarding the call to the VoIP system at the forwarding telephone number to establish a connection between the cellular system and the VoIP system, such that the VoIP system can be used to connect the call with the destination without connecting through the cellular connection between the dual-mode phone and the cellular system;

receiving, from the VoIP system, a query request for the destination number;

providing, to the VoIP system, the destination number, wherein the VoIP system connects the call to the destination over the IP connection;

disconnecting, via the VoIP system, the connection between the cellular system and the VoIP system; and disconnecting, via the cellular system and in response to disconnecting from the VoIP system, the cellular connection to the dual-mode phone.

2. The method recited in claim 1, wherein forwarding the call to the VoIP system at the forwarding telephone number comprises forwarding the call to the VoIP system via a public switched telephone network ("PSTN").

3. The method recited in claim 1, further comprising:
the cellular system recognizing that the call has originated from a phone requiring special call handling.

4. The method recited in claim 3, wherein obtaining a forwarding telephone number comprises obtaining a forwarding telephone number based on a recognition that the call has originated from a phone requiring special call handling.

5. The method recited in claim 3, wherein recognizing that the call has originated from a phone requiring special call handling comprises activating an origination attempt trigger associated with the dual-mode phone.

6. The method recited in claim 5, wherein the origination attempt trigger is a wireless intelligent network ("WIN") trigger.

7. The method recited in claim 1, further comprising:
the VoIP system obtaining the stored destination number; and
the VoIP system connecting the call with the destination without connecting through the cellular connection between the dual-mode phone and the cellular system.

8. The method recited in claim 7, wherein the VOIP system connects the call with the destination via a public switched telephone network ("PSTN").

9. The method recited in claim 7, further comprising:
the VoIP system determining that the dual-mode phone has connected with an IP network; and
the VoIP system performing a cellular-to-VoIP handoff, such that the call is connected with the dual-mode phone via the IP network without connecting through the cellular connection between the dual-mode phone and the cellular system.

10. The method recited in claim 9, further comprising:
the VoIP system disconnecting the connection between the VoIP system and the cellular system, such that the call is handled by the VoIP system and the call is no longer handled by the cellular system.

11. The method recited in claim 1, wherein the cellular system is a global system for mobile communications ("GSM") system.

12. The method recited in claim 1, wherein the cellular system is a code division multiple access ("CDMA") system.

13. In a voice over Internet Protocol ("VoIP") system, a method for handling a call placed by a dual-mode phone capable of operating in a cellular mode and in a VoIP mode, the method comprising:
the VoIP system accepting a connection with a cellular system comprising a mobile switching center ("MSC"), the connection comprising the call forwarded by the MSC to a the VoIP system at a forwarding telephone number of the VoIP system and placed by the dual-mode phone registered with the cellular system, wherein the dual-mode phone is configured to communicate with the cellular system via a cellular connection between the dual-mode phone and the cellular system and to communicate with the VoIP system via an Internet Protocol ("IP") connection, separate from the cellular system, between the dual-mode phone and the VoIP system;
transmitting, via the VoIP system, a query request for a destination number stored on the cellular system;
the VoIP system obtaining, from the MSC, the destination number stored by the cellular system, the destination number identifying a destination for the call;
the VoIP system connecting the call with the destination;
the VoIP system determining that the dual-mode phone has established an IP connection with an IP network;
the VoIP system performing a cellular-to-VoIP handoff, such that the call is connected with the dual-mode phone via the IP network without connecting through the cellular connection between the dual-mode phone and the cellular system; and
the VoIP system disconnecting the connection with the cellular system, such that the call is handled by the VoIP system and the call is no longer handled by the cellular system.

14. The method recited in claim 13, wherein performing a cellular-to-VoIP handoff comprises transmitting a session initiation protocol ("SIP") invite for reception by the phone.

15. The method recited in claim 13, wherein the VoIP system obtains a destination number in response to a termination attempt trigger associated with the dual-mode phone.

16. The method recited in claim 13, wherein the VoIP system obtaining the destination number comprises the VoIP system obtaining the destination number from a service control point ("SCP").

17. The method recited in claim 13, wherein the VoIP system obtaining the destination number comprises the VoIP system obtaining the destination number from an application server.

18. The method recited in claim 13, wherein performing a cellular-to-VoIP handoff comprises forking the call, such that the VoIP system simultaneously maintains the connection between the cellular system and the dual-mode phone, and a VoIP connection with the dual-mode phone via the IP network.

19. A computer program embodied on at least one non-transitory computer readable medium, the computer program comprising instructions executable by one or more computers to:
accept a connection with a cellular system comprising a mobile switching center ("MSC"), the connection comprising the call forwarded by the MSC to a Voice over Internet Protocol ("VoIP") system at a forwarding telephone number of the VoIP system and placed by the dual-mode phone registered with the cellular system, wherein the dual-mode phone is configured to communicate with the cellular system via a cellular connection between the dual-mode phone and the cellular system and to communicate with the VoIP system via an Internet Protocol ("IP") connection, separate from the cellular system, between the dual-mode phone and the VoIP system;
transmit a query request for a destination number stored on the cellular system;
obtain, from the MSC, the destination number stored by the cellular system, the destination number identifying a destination for the call;
connect the call with the destination;
determine that the dual-mode phone has connected with an IP network;
perform a cellular-to-VoIP handoff, such that the call is connected with the dual-mode phone via the IP network without connecting through the cellular connection between the dual-mode phone and the cellular system; and
disconnect the connection between the VoIP system and the cellular system, such that the call is handled by the VoIP system and the call is no longer handled by the cellular system.

20. The computer program recited in claim 19, further comprising instructions executable to:
    fork the call, such that the VoIP system simultaneously maintains the connection between the cellular system and the dual-mode phone, and a VoIP connection with the dual-mode phone via the IP network.

* * * * *